July 26, 1960

I. S. HOUVENER 2,946,090

DIE ASSEMBLY

Filed June 4, 1959

INVENTOR.
Irving S. Houvener
BY Earl D. Ayers
AGENT

United States Patent Office 2,946,090
Patented July 26, 1960

2,946,090

DIE ASSEMBLY

Irving S. Houvener, Midland, Mich., assignor to The Dow Chemical Company, Midland, Mich., a corporation of Delaware Filed June 4, 1959, Ser. No. 818,088

4 Claims. (Cl. 18—12)

This invention relates to extrusion dies and particularly to a die assembly which includes means for influencing the flow of extrudable material through particular parts of the die.

Most extruded products are produced by forcing the extrudable material directly through the opening of a die. The extrudable material, however, does not always flow at equal rates through all parts of die openings, especially in those dies having non-uniform cross sectional configurations. A considerable degree of skill has heretofore been required to make a die having a configuration such that the product extruded therethrough is of desired cross sectional configuration, does not warp due to uneven flow rate through the die, etc.

It is an object of this invention to provide an improved die assembly for extruding sections of irregular cross-sectional configuration.

Another object of this invention is to provide an improved and more economical extrusion die assembly.

A further object of this invention is to provide a die assembly whose flow characteristics may be quickly altered to suit changes in characteristics of the product being extruded.

In accordance with this invention there is provided a die assembly including a die orifice, a mixing chamber disposed contiguous to and communicating with the orifice, means for introducing extrudable material to said mixing chamber, and adjustable means extending into the mixing chamber for adjusting the flow of material through the die orifice.

The invention, as well as additional objects and advantages thereof, will best be understood when the following detailed description is read in connection with the accompanying drawings, in which.

Figure 1:
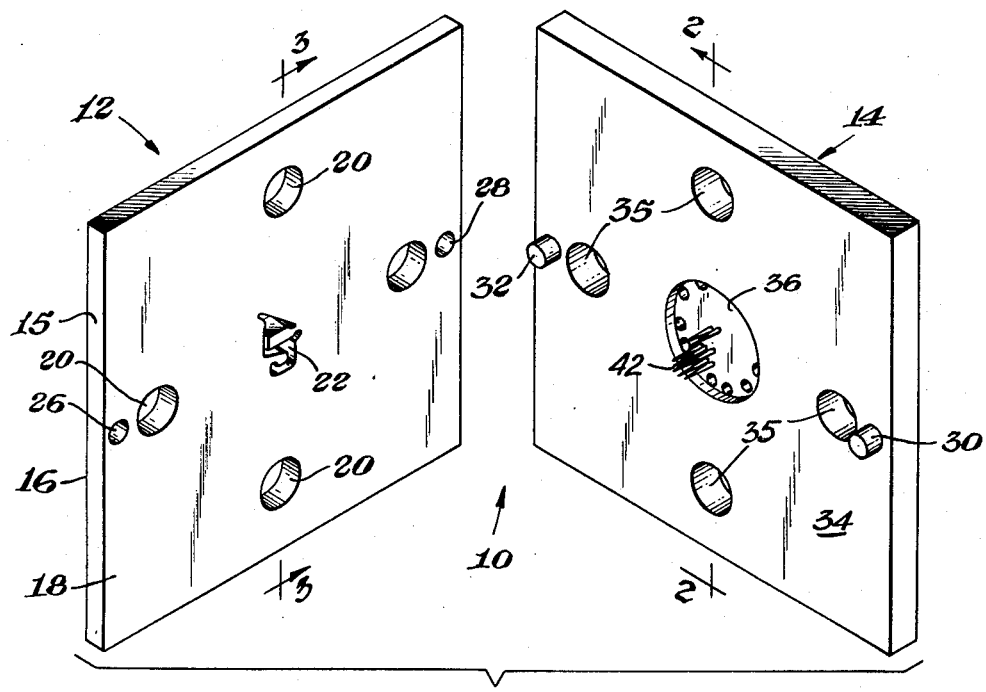
Fig. 1 is an isometric view of two mating die assembly sections, shown in un-assembled form.
Figure 4:
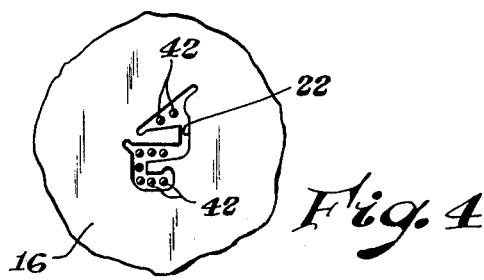
Fig. 4 is a fragmentary view looking into the exit face of an assembled die assembly made in accordance with this invention.
Figures 2, 3:
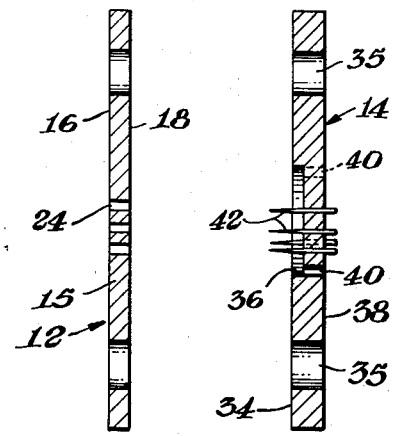
Fig. 2 is a sectional view taken along the line 2—2 of Fig. 1.
Fig. 3 is a sectional view taken along the line 3—3 of Fig. 1.

Referring to Figs. 1, 2 and 3, there is shown a die assembly, indicated generally by the numeral 10, comprising a die section, indicated generally by the numeral 12, and a mixing and flow control section, indicated generally by the numeral 14.

The die section 12 comprises a plate 15 having an exit face 16 and an entrance face 18, the faces 16 and 18 being parallel. Four bores 20 extend through the section 12 and are, for convenience as well as practicality, disposed symmetrically around a die opening 22 which likewise extends through the section 12.

The side walls 24 of the die opening 22 are disposed perpendicularly with respect to the section faces 16, 18.

A pair of bores 26, 28, which are so disposed as to mate with the lugs 30, 32 of the section 14, also extend through the section 12.

The mixing and flow control section 14 has a pair of flat, parallel faces, the exit face 34 being adapted to seat against the entry face 18 of the die section 12. An array of four bores 35, corresponding in size and location to the bores 20, extend through the section 14.

A counter bore 36 extends inwardly from the exit 34 face of the section 14. The counter bore 36 is of larger diameter than the maximum lineal dimension across the die opening 22 and is so disposed in the section 14 that when the sections 12, 14 are assembled the counter bore surrounds the die opening on the entry face side 18 of the section 12.

Figure 5:
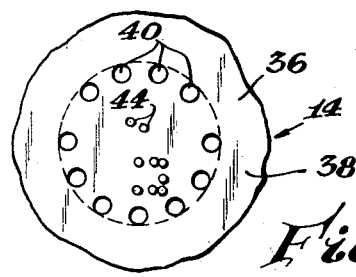
Fig. 5 is a fragmentary plan view of the face of the die section which abuts against the extruder.

The depth of the counter bore 36 (which constitutes a distribution chamber) is a function of the dimensions needed to provide a mixing chamber having a desired volume inventory of the particular material being extruded. Referring especially to Fig. 5, it may be seen that a plurality of small bores 40 extend through the entry face 38 of the section 14 and communicate with the counter bore or distribution chamber 36. As illustrated, the bores 40 are disposed adjacent to the perimeter of the chamber 36. The desired shape and cross sectional area of the product to be extruded influences the specific position of the distribution bores 40 and the number of them depends on the configuration and total cross sectional area of the die opening.

It has been found that excellent extrudes are obtained when the combined cross sectional area of the distribution bores 40 is approximately 80 percent of the cross sectional area of the die opening 22.

An array of flow control pins 42 pass through small bores in the section 14 and extend into the distribution chamber 36 and are aligned with the die orifice or opening 22. The flow control pins fit tightly within the bores 44, but may be pressed or punched further into or pulled away from the die opening or orifice 22 as needed to control the flow of material being extruded through the die orifice.

As mentioned before, the distribution chamber 36 is necessarily made larger in diameter than the die opening 22 so that the distribution bores 40 need not be disposed in direct alignment with any part of the die opening 22. By not having the distribution bores 40 discharging directly into the die opening 22, the flow of material which is to be extruded may be more evenly dispersed in the die opening 22 as a result of the changing flow pattern.

In operation, if the material being extruded flows more freely through one section of the die opening than through another section thereof, one or more flow control pins 42 is advanced into the distribution chamber 36 in alignment with the part or parts of the die opening 22 where the non-uniform flowing occurs. If needed, the flow control pins or elements may be advanced into the die opening 22 itself rather than merely into the distribution chamber 36 adjacent to the die opening.

Thus, while controlling the shape of the distribution chamber 36 and the number and positioning of the materials distribution bores 40 helps to assure a somewhat uniform material flow through the die opening 22, the adjustable flow control pins 42 provide more complete flow control means which can easily be adjusted to varying conditions of operation of the extruder and types of material being extruded.

The flow control elements 42 may have end configurations other than points as illustrated. For example, flat ends, knob ends, or spade ends have been used.

The bores 20 and 35, previously mentioned, and bolts (not shown) provide the means for locking the die assembly to an extruder or press.

What is claimed is:

1. A multiple part die assembly comprising a first plate and a second plate, each of said plates having an entry face and an exit face, the entry face of the first plate being adapted to bear against the exit face of the second plate, said plates having means for indexing themselves with respect to one another and for locking the plates together, said first plate having a die orifice extending between its entry and exit faces, said second plate having a mixing chamber which surrounds said die orifice when the plates are indexed and bearing against one another, the mixing chamber extending inwardly from the exit face of the second plate, a plurality of feed bores, said feed bores extending from the entry face of the second plate into the mixing chamber, an array of bores, said bores extending from the entry face of the second plate into the mixing chamber and being aligned with said die orifice of the first plate when said first and second plate are indexed with respect to one another, and a plurality of flow control elements disposed in said array of bores and extending into said mixing chamber.

2. A die assembly in accordance with claim 1, wherein the longitudinal axis of said feed bores is intersected by the entry face of said first plate when the plates are indexed.

3. A die assembly in accordance with claim 1, wherein said flow control elements are needle-like members which have shanks which are press fit into said array of bores.

4. A die assembly in accordance with claim 1, wherein at least one of said flow control elements extends into said die orifice when the plates are locked together.

References Cited in the file of this patent

UNITED STATES PATENTS 1,228,495    Tanzi ------------------ June 5, 1917

FOREIGN PATENTS 1,117,397    France ---------------- Feb. 20, 1956